United States Patent
Ioffe et al.

(10) Patent No.: US 10,830,874 B2
(45) Date of Patent: Nov. 10, 2020

(54) METHOD TO DETERMINE THE SUITABILITY OF A RADAR TARGET AS A POSITIONAL LANDMARK

(71) Applicant: Aptiv Technologies Limited, St. Michael (BB)

(72) Inventors: Alexander Ioffe, Bonn (DE); Wolfgang Doerr, Wiehl (DE); Uri Iurgel, Wuppertal (DE); Konstantin Statnikov, Dusseldorf (DE); Honghui Yan, Wuppertal (DE)

(73) Assignee: Aptiv Technologies Limited, St. Michael (BB)

(*) Notice: Subject to any disclaimer, the term of this patent is extended or adjusted under 35 U.S.C. 154(b) by 223 days.

(21) Appl. No.: 16/106,377

(22) Filed: Aug. 21, 2018

(65) Prior Publication Data
US 2020/0319300 A1    Oct. 8, 2020

(30) Foreign Application Priority Data
Sep. 12, 2017 (EP) ..................... 17190576

(51) Int. Cl.
*G01S 7/41* (2006.01)
*G01S 13/931* (2020.01)
(Continued)

(52) U.S. Cl.
CPC ................ *G01S 7/41* (2013.01); *G01S 7/414* (2013.01); *G01S 7/415* (2013.01); *G01S 13/08* (2013.01);
(Continued)

(58) Field of Classification Search
CPC . G01C 21/3644; G05D 1/0234; G05D 1/0257
See application file for complete search history.

(56) References Cited

U.S. PATENT DOCUMENTS

| 4,069,888 A | * | 1/1978 | Wolters ............... G05D 1/0234 180/169 |
| 5,208,757 A | * | 5/1993 | Appriou ............... G01C 21/005 701/23 |

(Continued)

FOREIGN PATENT DOCUMENTS

| DE | 10 2014 011731 A1 | 4/2015 |
| DE | 10 2015 208228 A1 | 11/2016 |

(Continued)

*Primary Examiner* — Bernarr E Gregory
(74) *Attorney, Agent, or Firm* — Colby Nipper PLLC

(57) ABSTRACT

A vehicle-based method to determine the suitability of an object in the vicinity of a vehicle as a suitable positional landmark, comprising the steps of: a) emitting a plurality of radar signals from a vehicle; b) detecting the radar returns from said emitted radar signals reflected by said object; c) analyzing at least one parameter of at least one radar return to determine the extent to which said object is a stationary object; d) analyzing at least one parameter of at least one radar return to determine the extent to which said object is a single scatterer; e) analyzing at least one parameter of a plurality of radar returns to determine the extent to which said parameter varies with the azimuthal angle between said vehicle and said object, f) determining the suitability of said landmark for the results of steps c), d) and e).

8 Claims, 3 Drawing Sheets

(51) Int. Cl.
   *G01S 13/42* (2006.01)
   *G01S 13/26* (2006.01)
   *G01S 13/08* (2006.01)
   *G01S 13/58* (2006.01)
   *G01S 13/72* (2006.01)
   *G01S 13/00* (2006.01)

(52) U.S. Cl.
   CPC .............. *G01S 13/26* (2013.01); *G01S 13/42* (2013.01); *G01S 13/931* (2013.01); *G01S 13/582* (2013.01); *G01S 13/584* (2013.01); *G01S 13/726* (2013.01)

(56) References Cited

U.S. PATENT DOCUMENTS

| | | | | |
|---|---|---|---|---|
| 5,957,984 | A * | 9/1999 | Rencken | G05D 1/0274 |
| | | | | 701/23 |
| 6,002,983 | A * | 12/1999 | Alland | G01S 13/66 |
| | | | | 701/301 |
| 7,250,901 | B2 * | 7/2007 | Stephens | G01S 7/026 |
| | | | | 342/126 |
| 7,840,075 | B2 * | 11/2010 | Vacanti | G01S 13/86 |
| | | | | 382/218 |
| 8,155,877 | B2 * | 4/2012 | Baudisch | G01C 21/3644 |
| | | | | 701/300 |
| 9,030,353 | B2 * | 5/2015 | Kubota | G01S 13/937 |
| | | | | 342/176 |
| 9,410,804 | B2 * | 8/2016 | Rintanen | G05D 1/0278 |
| 9,464,914 | B1 * | 10/2016 | Mizuno | G01C 21/3644 |
| 9,651,388 | B1 * | 5/2017 | Chapman | G01C 21/165 |
| 9,658,069 | B2 * | 5/2017 | Stahlin | G01C 21/165 |
| 9,933,268 | B2 * | 4/2018 | Bagheri | G01C 21/32 |
| 10,126,141 | B2 * | 11/2018 | Golding | G01C 21/3644 |
| 10,222,469 | B1 * | 3/2019 | Gillian | G01S 13/88 |
| 2005/0270228 | A1 * | 12/2005 | Stephens | G01S 13/876 |
| | | | | 342/146 |
| 2006/0149458 | A1 * | 7/2006 | Costello | G01C 21/005 |
| | | | | 701/438 |
| 2008/0154504 | A1 * | 6/2008 | Hein | G01S 5/0284 |
| | | | | 701/300 |
| 2010/0280699 | A1 * | 11/2010 | Bageshwar | G05D 1/0231 |
| | | | | 701/26 |
| 2011/0153338 | A1 * | 6/2011 | Anderson | G05D 1/0274 |
| | | | | 705/1.1 |
| 2011/0320123 | A1 * | 12/2011 | Choi | G05D 1/028 |
| | | | | 701/300 |
| 2013/0304383 | A1 * | 11/2013 | Bageshwar | G01C 21/165 |
| | | | | 701/534 |
| 2015/0378015 | A1 * | 12/2015 | You | G01S 13/06 |
| | | | | 701/469 |
| 2018/0018395 | A1 * | 1/2018 | Wu | G06F 16/29 |
| 2018/0052222 | A1 | 2/2018 | Zeisler | |
| 2018/0306589 | A1 * | 10/2018 | Holz | G01C 21/28 |
| 2018/0307241 | A1 * | 10/2018 | Holz | G05D 1/0274 |

FOREIGN PATENT DOCUMENTS

| | | |
|---|---|---|
| DE | 10 2016 015405 A1 | 7/2017 |
| EP | 3 144 696 A1 | 3/2017 |

* cited by examiner

METHOD TO DETERMINE THE SUITABILITY OF A RADAR TARGET AS A POSITIONAL LANDMARK

TECHNICAL FIELD OF INVENTION

This invention relates to a method of determining the position of a host vehicle and in particular to determining a suitable landmark for geographical mapping.

BACKGROUND OF INVENTION

Self-localization, that is determining the precise location of a host vehicle is one of the most important functions for accurate automated driving or such driver assistance schemes such as collision prevention systems. Current car navigation systems generally use a GPS navigation system to estimate the vehicle position. However, such a GPS navigation system is insufficient for precise self-localization of road vehicles due to effects such as reflections caused by buildings and occlusions of GPS signals from satellites. To overcome this problem, many landmark-based ego localization approaches have been elaborated in the past.

It is known to equip vehicles with radar systems/modules. Such radar systems are able to detect radar reflections (i.e. radar detections) from objects in the vicinity and process the data with respect to said radar reflections. Usually, the information needed for current self-localization and mapping (SLAM) procedure is collected from such (reflection/detection) data provided by the radar modules over multiple consecutive scans to identify for example a fixed landmark. This mapping information is updated over time, and a precise superposition of the individual radar-based maps with the GPS maps is performed. In such a way, for example the geographical position determined by GPS is accurately refined by such local data from radar returns.

Thus, in order to reduce the accumulation of errors introduced by non-precise superposition, landmark-based alignment of those radar images is a preferred solution. In the landmark-based SLAM procedure, a key task is to determine one or more suitable landmarks (i.e. objects) in the environment, i.e. in the vicinity of the vehicle which could serve as suitable and quality positional references (anchors) for precise superposition of the individual maps.

Available landmark determination approaches are based on e.g. signal-to-clutter ratio, point spread function matching, image analysis (e.g. by gradient analysis, or template matching etc.), likelihood ratio test, range bin variance analysis or differential interferogram methodologies. However, those approaches are not intended for the automotive environment. Landmarks have been previously examined by single-scan observations from a certain view-angle. Those approaches are typically not robust enough due to complexity of the automotive environment.

SUMMARY OF THE INVENTION

In one aspect is provided a vehicle-based method to determine the suitability of an object in the vicinity of a vehicle as a suitable positional landmark, wherein the suitable positional landmark is a single stationary scatterer whose scattering position, reflectivity and polarization do not vary over time, distance and observation angle. The method includes the steps of:
a) emitting a plurality of radar signals from a vehicle;
b) detecting the radar returns from said emitted radar signals reflected by said object;
c) analyzing at least one parameter of at least one radar return by comparing the radar return with that expected from a stationary target to determine if said object is a stationary object;
d) analyzing at least one parameter of at least one radar return by determining the correlation of the radar return with a known system-dependent single scatterer response to determine if said object is a single scatterer;
e) analyzing at least one parameter of a plurality of radar returns to determine the variation of said parameter with the azimuthal angle between said vehicle and said object,
f) determining the suitability of said landmark for the results of steps c), d) and e).

The method may be used in a vehicle based system, said system including a radar antenna and receiver unit adapted to transmit radar signals and receive reflected radar detections from objects in the vicinity of the vehicle.

Said radar antenna and receiver unit may comprise a plurality of antenna and receiving elements arranged as an antenna array.

Step d) may comprise analyzing range profiles and Doppler profiles of the radar returns across the plurality of antennas.

Step f) may comprise determining the extent to which one or more of the following varies with azimuthal angle: phase characteristics, polarization characteristics and signal-to-noise ratio.

Step c) may comprise analyzing said radar parameter in conjunction with speed, direction of motion or positional data from a navigation system of said vehicle.

In step e) said change in azimuthal angle may be determined from location or speed and direction information from a navigation system of said vehicle.

Step e) may comprise determining from said radar, changes in the scattering center position of said object with azimuthal angle.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention is now described by way of example with reference to the accompanying drawings in which.

DETAILED DESCRIPTION

Figure 1:
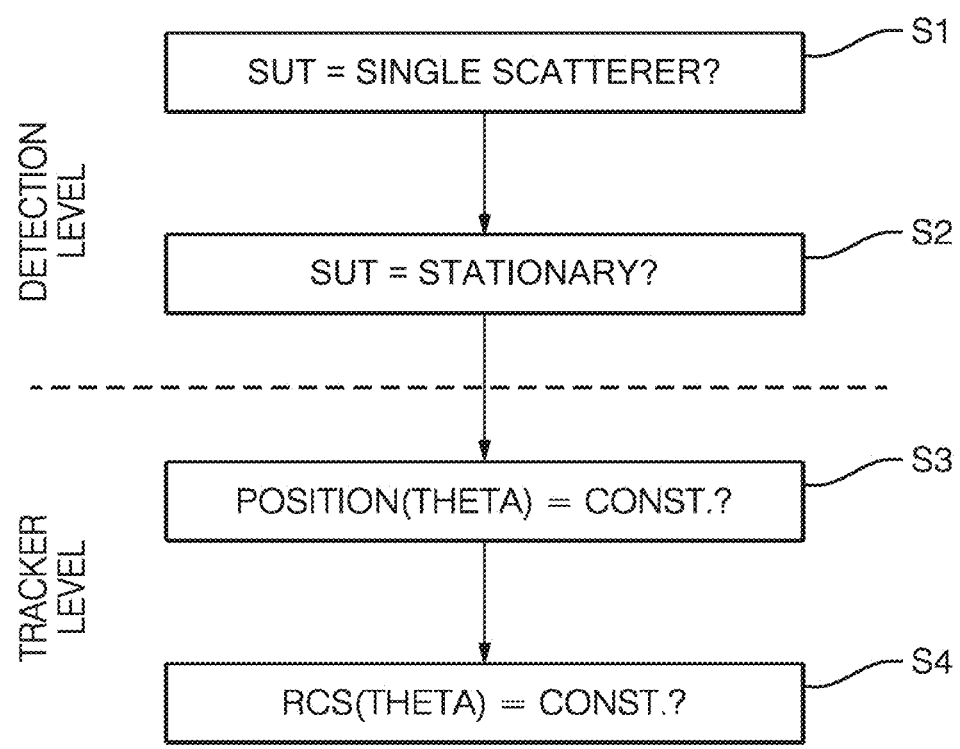
FIG. 1 shows a flowchart illustrating one example of the methodology used in one aspect.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Aspects of the invention aim to improve the precision of the radar-based SLAM procedure, by determining suitable landmarks. These landmarks can be used for geographical positioning techniques such as precise location determination e.g. in conjunction with GPS data/maps (in superposition techniques). Reliable and robust landmarks are determined from detections of the sensed vehicle environment (i.e. from processed radar reflection/detection data), that allows quality assessment and determination/classification of appropriate landmarks.

In one aspect, the method determines all of the following criteria in order to assess whether an object in the vicinity of the vehicle, in other words a detected target, (detected via processing of radar reflection data), is suitable as a landmark:

a) In one step it is determined whether the detected object is a stationary target. A stationary target may be an object such as a statue or lamppost. Several techniques are known which can be used to determine whether the object is stationary or not. If the target is stationary, it is determined that this is a good potential landmark.

b) In a further criterion (step), it is determined whether, or to what extent, the object (target) is a single scatterer. A single scatterer is a preferred candidate for a reference landmark.

c) In a further determination step, it is determined to what extent the reflected radar parameter varies with azimuthal angle, e.g. how the scattering center position of the detected object (target) varies when illuminated (by radar) i.e. observed from different azimuthal angles over time. If the position does not vary with angle of observation, the detected object is regarded as a good potential landmark.

One or more of the above criteria can be determined by analysis of the radar detection/reflection data in particular the reflectivity pattern of the target/object (such as the radar cross section (RCS). For the step c) this can be measured e.g. as a function of azimuth angle with respect to the host vehicle. This can be performed by processing reflection data from the target at different angles whilst the host vehicle moves relative to it, i.e. whilst driving. Processing of the radar reflection data form the target at different angles can provide a determination of the "quality" of the target as a suitable landmark can be better estimated. If its reflectivity pattern is omnidirectional (like e.g. from street posts), then it is an indicator that the landmark under test is of a "high quality".

The classification of a target may be carried out in two processing domains: on a detection level and on a tracker level. In one aspect the features of the object/target which are to be analysed as a suitable landmark (sometime referred to as scatterer under test (SUT)) extracted on the detection level with the tracker-based features (collected over time or use a mapping approach) to provide the final classification result.

On the tracker level, the detections provided by radar of one or more objects (targets) in the vicinity of the vehicle are processed and filtered based on the motion state. Subsequently only those detections that indicate a stationary object are used.

FIG. 1 shows a flowchart illustrating one example of the methodology used in one aspect. In step S1 it is determined whether the SUT is a single scatterer. In the second step S2 it is determined whether the SUT is stationary.

In steps S3 and S4 it is determined how the observed target parameters change with different azimuth angles, $\theta$. In step 3 the step determines the azimuth (positional angle) of the vehicle with respect to the SUT, e.g. whether $\theta$ is constant. In step 4 it is determined how parameters of the radar detection from the SUT varies with the azimuth angle, e.g. to what extent the $RCS(\theta)$, that is the Radar Cross Section as a function of $\theta$ varies.

Steps S1 and S2 can take place at the detection level that is to say without the vehicle moving relative to the SUT and steps S3 and S4 can take place at the tracker level where there is relative movement of the vehicle and SUT with respect to the azimuthal angle. If steps 1 or 2 show the SUT to be either not a single scatterer or a stationary object then steps 3 and 4 will not be implemented in one example. Details of these steps will be explained hereinafter.

In one method, the output provides a parameter which is indicative of the quality of a detected object as a suitable landmark. In the example therefore the output provides a "soft decision" having the following parameter: the parameter output is 1 for a high-quality landmark, and 0, if the target is not useful as a landmark.

So, as mentioned, a good landmark for vehicular radar applications is a single stationary scatterer, whose scattering position, the observed complex reflectivity and polarization do not vary over observation angles, distance, and time. Furthermore, the reflection/detections of a target which is a suitable landmark provide a strong signal amplitude compared to noise and clutter in the vicinity and is preferably detectable from multiple sensors on the vehicle. These characteristics may be fed/input into a feature vector for classification. Details of the various steps will now be explained.

Single Scatterer Determination

In an initial step, is provided a single scatterer test. In the following, one or more various methods may be utilised to test whether an object/target (SUT) is a single scatterer (originates from a single scattering center).

Amplitude spectrum derived parameters or a phase-spectrum derived object parameters can be utilized to determine the extent to which a SUT is a single scatterer.

As used herein, the term phase-spectrum refers to the phase spectrum component of a radar return signal. It is known to provide system where a transmit antenna radiates Radio Frequency (RF) signal that propagates toward an object in the radar field-of-view. The radio frequency signal may be pulse compressed waveform such as a series of waveform pulses commonly called 'chirps' or Frequency Modulated Continuous Wave, Pulse-Doppler and Frequency Shift Key. The signals reflected by the object depend on a backscatter property (i.e. Radar Cross Section) of the object. The signals reflected by the object can be received by receiving antenna-array elements, which are typically connected to single (i.e. time-multiplexed) or multiple (i.e. not time-multiplexed) signal conditioning and processing devices.

Example Technique 1

Detected signals are typically time-domain signals and frequency transformation (e.g. a Fourier transform) can be used to generate frequency profiles. Such frequency profiles can be analysed to determine the extent to which the SUT is a single scatterer.

For example Pulse-Doppler signal processing can be used to separate reflected signals into a number of "peaks" that occur (after the 2-D Fourier processing) in the 2-D spectral domain (called range-Doppler map).

One method to analyze if a target response originates from a single scatterer is to involve a (complex-valued) cross-correlation between the measured radar response with the corresponding so called system-dependent Point Spread Function (PSF). PSF of a radar system describes its response to an ideal single-scatterer target. If the correlation coefficient is below a (e.g. predetermined) threshold, then the target is considered to be a non-single scatterer.

A Point Spread Function (PSF) of a radar system describes the response of that radar system, which is observed at the output of the receiver signal processing chain, to a received signal being reflected by an ideal single scatterer. In the case of the Pulse-Doppler radar technique/signal processing, the PSF is the Fourier-transformed weighting/windowing function that is multiplied with the sampled time domain data set prior to the (2-D) FFT procedure. Each single scatterer response, which corresponds to a dirac impulse at a corresponding range/Doppler frequency, is therefore convolved with that PSF. When no tapering window is applied (which effectively corresponds to an application of the rect window), the PSF is the sinc function. Even in this case, the PSF is not a dirac impulse but a sinc function due to the limited observation/sampling time. To reduce the so called spectral leakage (resulting from the finite observation interval) and the sidelobe level of the PSF, weighting functions (e.g. Dolph-Chebyshev window) are applied to the sampled data.

Example Technique 2

Similar to technique 1, evaluating the range-Doppler spectrum of a detection, is carried out by correlating (comparing) the measured complex-valued range-Doppler spectrum of a detection obtained from the M antennas (the so called "beam vectors") with a known system-dependent single-scatterer response.

Other

The skilled person would be aware of other e.g. more refined techniques of determining the extent to which the SUT is a single scatterer. In the Applicants co-pending application EP 16188715 is described a method of determining the extent to which the SUT is a single scatterer by analyzing the symmetry of the radar returns of an antenna and receiver array in the frequency domain. As it is a matter of interference between signals reflected from scattering centers located in relative close proximity to each other, relative phase difference between signals can be directly evaluated in the frequency domain local to the superposed signal frequency bin. A phase difference is calculated between the first symmetrical frequency bins to the superposed signal detection frequency bin. By the first symmetrical frequency bins means the frequency bins those are one frequency bin away from the superposed signal detection frequency bin to the plus and minus direction (i.e. +/−1 bin away). The estimated phase difference converges to a minimum value (or zero) if the detected signal is from a single point scattering center. This is because the signal spreads (amplitude and phase-spectrums) uniformly to symmetrical neighboring frequency bins for a signal that is weighted in the time domain by symmetrical window coefficients about its maximum at the center. In the case of interference of signals reflected from multiple near-each-other scattering centers, these first symmetrical frequency bins likely contain unequal signal amplitude and phase values because the scattering centers possess relative position differences and/or rate of change of position differences as those are un-centered to a specific dominant scattering center. That means phase difference between these first symmetrical frequencies bins does not necessarily converge to a minimum value as it was the case for single point scattering center. For antenna-array configurations, the averaging of these phase differences across the antenna-array elements provides a robust phase difference value that can be used to distinguish single point and multiple near scattering center(s). As discussed, there is also phase difference variation across antenna-array elements due to the fact that relative position and/or rate of change of position differences of scattering centers are not equal for a distributed antenna-array configuration. Therefore, evaluating the slope or the variance of the slope of the phase difference across antenna-array elements can also be employed to identify between single point and multiple near scattering centers.

Stationary Target Test

Whether or not the target is a suitable landmark a determination of whether it is static or stationary is performed. In a basic method, assuming the vehicle is stationary, analyzing parameters of radar returns can be used to detect whether the SUT is stationary (e.g. using Doppler analysis). In a further method, location or speed information (for example from navigation instruments of the vehicle) is used to determine how the vehicles position changes, and compare radar return data from the SUT with that expected from a stationary target. So, in an example, the target angle (that is estimated by the radar unit itself) and the variation of this, may be determined and compared with the angle computed by the vehicle navigation system as the vehicle moves, and a comparison made. Other techniques such as Doppler techniques may alternatively be used.

Test to Determine how the Detection RCS Varies with Azimuth Angle

For a given target as a potential landmark (SUT), a parameter of the reflected radar return, such as reflected energy (RCS) may be determined (and stored) at multiple time-points (scans) as the host-vehicle moves. The degree to which these parameters change with azimuthal angle can then be assessed. The less the change in parameter nature/value, the better the SUT is as a landmark. So in other words multiple radar scans may be taken over time such that the radar sensor array observes that target from different observation points, respectively. So data may be processed to determine the changes in radar cross section or generally any parameter of radar return with change in azimuth angle.

Figure 2:
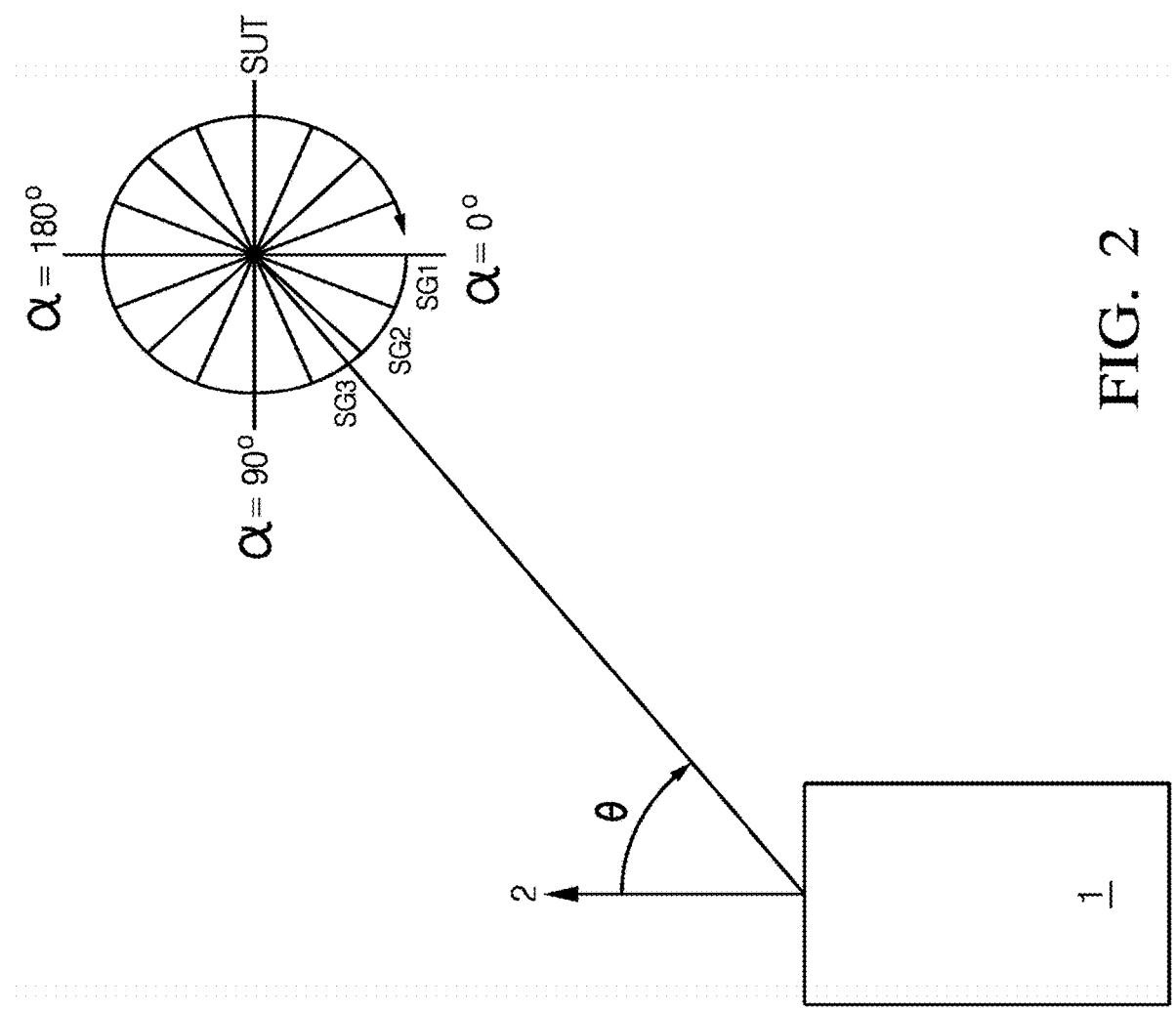
FIG. 2 shows a plan view of a vehicle and a scatterer under test.

FIG. 2 shows a plan view of a vehicle and a SUT, i.e. the horizontal plane as in a map. This figure shows a host (ego) vehicle 1 travelling in the direction shown by arrow 2 (this can be regarded as the trajectory of the vehicle). The SUT is shown as reference numeral 3. The line of sight from the vehicle to the SUT is shown by line 4, and the observation angle is given as θ. The figure shows angular segmentation radially from the SUT; the SUT azimuthal angle (segmentation angle) given as α. This may be segmented into a number N of segments SG1, SG2, SG3, . . . and so on. As θ changes the angle of sight of the vehicle from the SUT (segmentation angle) α, will change correspondingly. In general the changes in radar parameters are determined as θ and therefore as α changes.

In one method one or more parameters are measured and compared for two or more segments, as the line of sight falls within the appropriate segment. So in other words in one method reflectivity information belonging to a target is organized in the following manner: instead of storing the reflectivity information according to the scan index, the (extents of) the reflectivity pattern (the azimuth axis) is divided into N angle segments (for example divide the 360-degrees range into N=16 angle segments). For every angle segment, corresponding radar parameters such as reflectivity values obtained and stored (i.e. from the multiple radar scans). This may be regarded as inverse mapping.

The above segmentation technique lends itself to a histogram approach used to determine how radar parameters vary with vehicle and SUT relative azimuthal angle.

Figure 3:
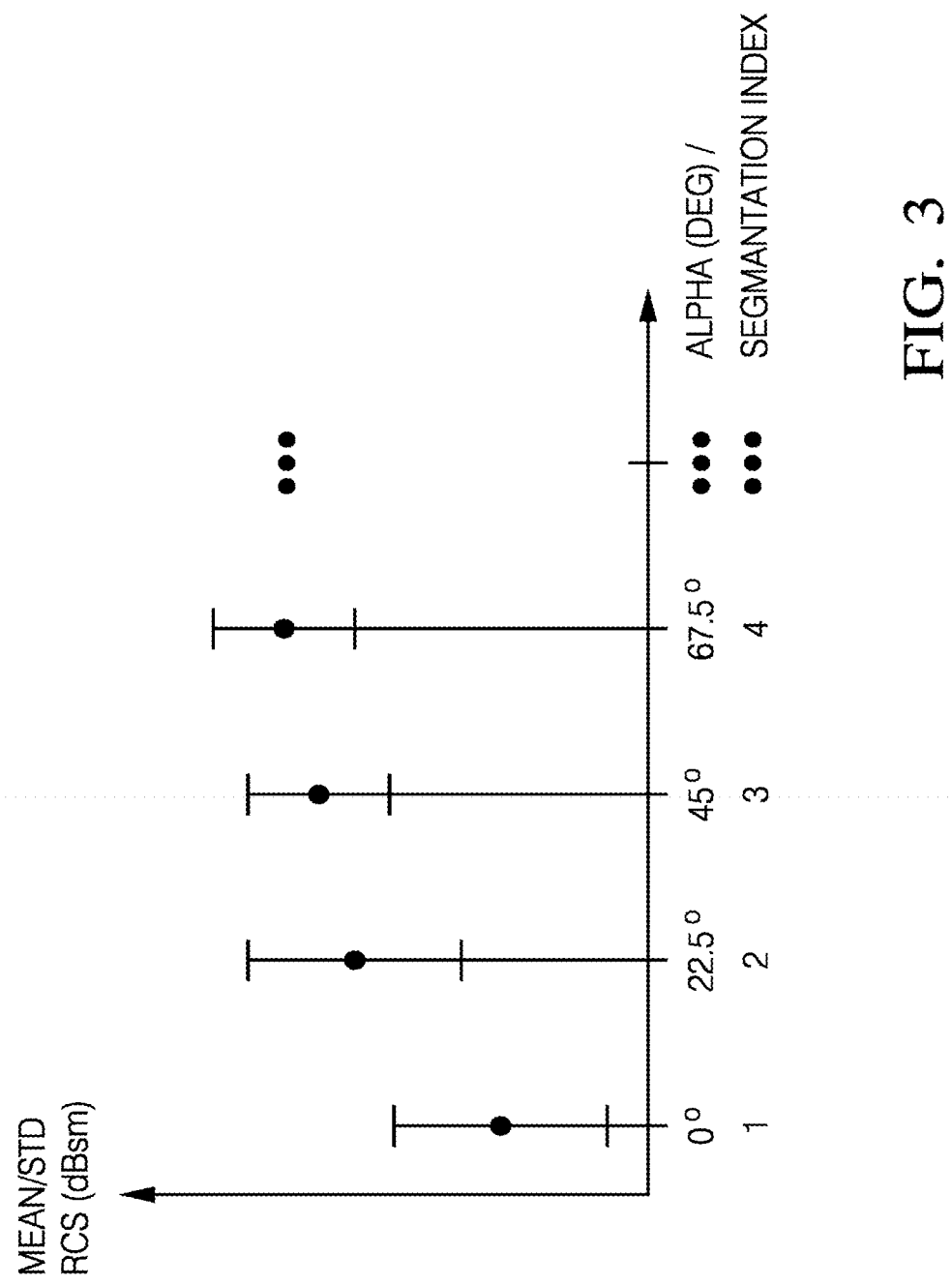
FIG. 3 shows a histogram showing inverse mapping of the mean values of the RCS against the angle $\alpha$ in terms of the segments shown in FIG. 2.

FIG. 3 shows a histogram showing inverse mapping of the mean (and standard deviation, std) values of the RCS against the angle α in terms of the segments shown in FIG. 2. In aspects not only the reflectivity (the amplitude) of a target under test is evaluated for every angle segment, but alternatively or additionally the one or more of the following parameters may be determined: phase, polarization and signal-to-noise ratio. How these parameters vary with azimuthal angle θ i.e. segmentation angle α, yields information on the quality of the landmark. The more there is variation of the parameters with said angles the less is the quality of the ST as a suitable landmark.

In general the classification of a target may be carried out in two processing domains: on the detection level and on the tracker level. In aspects the features of the SUT that are extracted on the detection level are combined with the tracker-based features (collected over time or use a mapping approach) to provide the final classification result; to classify whether the SUT is a suitable landmark. On the tracker level, detections based on the motion state may be filtered out and only stationary detections used. The elevation angle of SUT (if available) may be taken into consideration, because a scatterer on the ground is preferable as it causes no multipath reflections.

While this invention has been described in terms of the preferred embodiments thereof, it is not intended to be so limited, but rather only to the extent set forth in the claims that follow.

We claim:

1. A vehicle-based method to determine the suitability of an object in the vicinity of a vehicle as a suitable positional landmark, wherein the suitable positional landmark is a single stationary scatterer whose scattering position, reflectivity and polarization do not vary over time, distance and observation angle,
the method comprising the steps of:
a) emitting a plurality of radar signals from a vehicle;
b) detecting the radar returns from said emitted radar signals reflected by said object;
c) analyzing at least one parameter of at least one radar return by comparing the radar return with that expected from a stationary target to determine if said object is a stationary object;
d) analyzing at least one parameter of at least one radar return by determining the correlation of the radar return with a known system-dependent single scatterer response to determine if said object is a single scatterer;
e) analyzing at least one parameter of a plurality of radar returns to determine the variation of said parameter with the azimuthal angle between said vehicle and said object; and
f) determining the suitability of said landmark for the results of steps c), d) and e).

2. A method as claimed in claim 1 used in a vehicle based system, said system including a radar antenna and receiver unit adapted to transmit radar signals and receive reflected radar detections from objects in the vicinity of the vehicle.

3. A method as claimed in claim 2 wherein said radar antenna and receiver unit comprises a plurality of antenna and receiving elements arranged as an antenna array.

4. A method as claimed in claim 2 wherein step d) comprises analyzing range profiles and Doppler profiles of the radar returns across the plurality of antennas.

5. A method as claimed in claim 1 wherein step f) comprises determining the extent to which one or more of the following varies with azimuthal angle: phase characteristics, polarization characteristics and signal-to-noise ratio.

6. A method as claimed in claim 1 wherein step c) comprises analyzing said radar parameter in conjunction with speed, direction of motion or positional data from a navigation system of said vehicle.

7. A method as claimed in claim 1 wherein in step e) said change in azimuthal angle is determined from location or speed and direction information from a navigation system of said vehicle.

8. A method as claimed claim 1 wherein step e) comprises determining from said radar, changes in the scattering center position of said object with azimuthal angle.

* * * * *